United States Patent [19]

Dory

[11] 4,242,803
[45] Jan. 6, 1981

[54] EQUIPMENT UNIT FOR CHECKING DEFORMATIONS OF A VEHICLE BODY

[75] Inventor: Alain Dory, Saint Colombre, France

[73] Assignee: Celette S.A., Vienne, France

[21] Appl. No.: 30,139

[22] Filed: Apr. 16, 1979

[30] Foreign Application Priority Data

Apr. 21, 1978 [FR] France .............................. 78 11833

[51] Int. Cl.³ ...................... G01C 15/12; G01B 11/26
[52] U.S. Cl. ................................ 33/288; 33/180 AT;
33/174 G
[58] Field of Search ......... 33/174 G, 174 R, 180 AT,
33/181 AT, 288, 228, 193, 286

[56] References Cited

U.S. PATENT DOCUMENTS

| | | | |
|---|---|---|---|
| 3,805,396 | 4/1974 | Hunnicutt | 33/174 G X |
| 4,098,003 | 7/1978 | Negrin | 33/288 |
| 4,174,623 | 11/1979 | Le Grand | 33/180 AT X |

Primary Examiner—Harry N. Haroian
Attorney, Agent, or Firm—Michael J. Striker

[57] ABSTRACT

The equipment unit comprises a checking bench constituted by a plurality of removable cross-members provided with uniformly spaced holes for fixing in different positions on longitudinal members, and two removable longitudinal sole-pieces each provided on one side with a lateral appendage for mounting measuring accessories. The vehicle body is secured to the sides of the bench at intermediate points while two brackets or sets of brackets for attaching or checking the body are fixed on the front and rear portions respectively of the bench. It is thus possible to modify the positions of the cross-members, sole-pieces and brackets with respect to each other and to carry out with equal ease a positive checking operation, a measuring operation or a body-reshaping and truing operation.

6 Claims, 16 Drawing Figures

EQUIPMENT UNIT FOR CHECKING DEFORMATIONS OF A VEHICLE BODY

This invention relates to devices and appliances employed for checking any deformations of a vehicle body.

There exist at the present time two types of appliances of this type, namely: on the one hand appliances of the so-called "positive check" type and, on the other hand, appliances for carrying out a check by measuring the position of certain specific points.

Appliances of the first type are essentially constituted by a checking frame or bench jig fitted with a number of sets of jig brackets for securing the vehicle body to be checked, these brackets being so designed as to permit attachment to the body at predetermined points of this latter. When a damaged vehicle body has been suitably reshaped and body deformations have been removed, the different specific fastening brackets or jig brackets provided for the corresponding vehicle must accordingly be such that said brackets can be attached to the different respective points. The basic design concept of this appliance is such that this latter can be employed for body-reshaping or straightening operations by means of hydraulic traction or thrust units whilst the vehicle body is secured to the checking bench jig.

This design in any case represents an inherent advantage of this type of equipment which is endowed with very high strength and rigidity, not only in the case of the bench jig but also in the case of the fastening brackets. The other advantages of this type of equipment are essentially as follows:

(a) simplicity of use, which makes it unnecessary to have recourse to highly qualified personnel since there is practically no attendant risk of error in the use of the jig brackets;

(b) ease of correct position maintenance of sub-frame parts to be replaced;

(c) ease and rapidity in checking reshaping and truing operations after completion of these latter.

However, equipment units of this type have the disadvantage of being relatively costly. This arises from the fact that a complete set of jig brackets has to be provided for each type of vehicle for the purpose of attachment at different body locations at which it is important to perform a checking operation. In point of fact, these jig brackets must be machined with care and overdimensioned in order to afford resistance to the stresses applied by the hydraulic devices employed for reshaping and truing operations. A further disadvantage of this type of equipment lies in the fact that storage of the different sets of jig brackets entails the need for a large available storage area.

In regard to the appliances of the second type mentioned above, these appliances are essentially designed to carry out checking operations which consist in taking certain measurements between different predetermined points of a vehicle body. Some of these appliances are constituted by a lightweight frame structure on which it is possible to adapt measuring gages or alternatively graduated rules or any other suitable measuring elements.

The advantage offered by appliances of this second type lies in the fact that the acquisition of specific jig brackets for each type of vehicle is no longer necessary. On the other hand, these appliances do suffer from a certain number of disadvantages, especially the following:

(a) relative fragility of these appliances which are not adapted to the exacting conditions of utilization of these latter;

(b) the need to employ highly qualified personnel since no error of reading or appreciation can be permitted;

(c) slowness of checking after performance of reshaping and truing operations by reason of the need to re-check each point relating to a straightened portion of the vehicle body;

(d) lack of accuracy of these appliances arising from deformations of frames having insufficient strength and rigidity;

(e) the need to carry out straightening or truing-up of the appliance with respect to the vehicle body position, which is sometimes very difficult to achieve;

(f) frequent inadequacy of the fastening system which is usually provided and consists in anchoring the bottom body flanges; such inadequate attachment can be the cause of deformation of the body enclosure or occupant compartment if special precautions have not been contemplated within the interior of said compartment.

For the reasons given in the foregoing, the aim of the present invention is to produce an appliance which is so designed as to derive benefit from the respective advantages of these two types of appliances of the prior art while circumventing the inherent disadvantages of these latter.

The appliance under consideration comprises a bench jig or so-called checking bench of conventional design and consisting of a platform which is constituted by beams or the like. However, said appliance further comprises in conjunction with said checking bench:

on the one hand, a plurality of removable cross-members which are intended to be fixed in different positions on the longitudinal members of the checking bench, a number of series of uniformly spaced holes being formed in said longitudinal members;

and, on the other hand, two movable longitudinal sole-pieces each provided on one side with a lateral appendage and intended to be fixed on the checking bench substantially in the central axis of the front side-members of the vehicle to be checked.

In point of fact, these beams and sole-pieces as well as the appendages of these latter are provided with series of uniformly spaced holes for securing body attachment or checking elements and/or measuring or checking accessories.

The attaching or checking elements which are provided for securing a vehicle body to the checking bench comprise:

on the one hand, two clamps or two pairs of clamps placed at intermediate points of the sides of said bench in order to clamp the bottom body flanges; and, on the other hand, two jig brackets for fastening or checking or two sets of brackets which are intended to be fixed respectively on the front portion and on the rear portion of said checking bench.

However, it should be noted that the fastening brackets contemplated in accordance with the invention are much more simple both in structure and in design than the jig brackets usually employed on the so-called "positive checking" vehicle bench jigs. This is due to the fact that the fastening brackets which are now proposed can be fixed in immediate proximity to the different points to be checked on a predetermined vehicle since it is possible to modify both the position of these brackets on the front cross-members or beams which serve as bracket supports and the position of said cross-members or of said beams.

By means of the appliance under consideration, it is possible to carry out with equal ease either a checking operation of the so-called "positive" type or checking by taking a certain number of measurements. In the first case, fastening brackets which are specific to the type of vehicle to be checked have to be mounted on the bench as well as on the cross-members and the longitudinal sole-pieces. Again in this case, however, these brackets are of much more simple design than the jig brackets usually employed on a positive-checking bench jig. In the second case, different measuring instruments such as checking gages or graduated rules for taking a certain number of measurements are intended to be adapted to the ancillary components of the checking bench.

Moreover, the apparatus under consideration further comprises removable assembly devices for adapting gages or other elements for checking the location of points of attachment of certain motor vehicle components such as, for example the points of attachment of shock-absorbers of the "McPherson" type.

However, the different characteristic features of the appliance in accordance with the invention will become apparent from the following description, reference being made to the accompanying drawings which are given solely by way of indication, and in which:

Figures 1, 2:
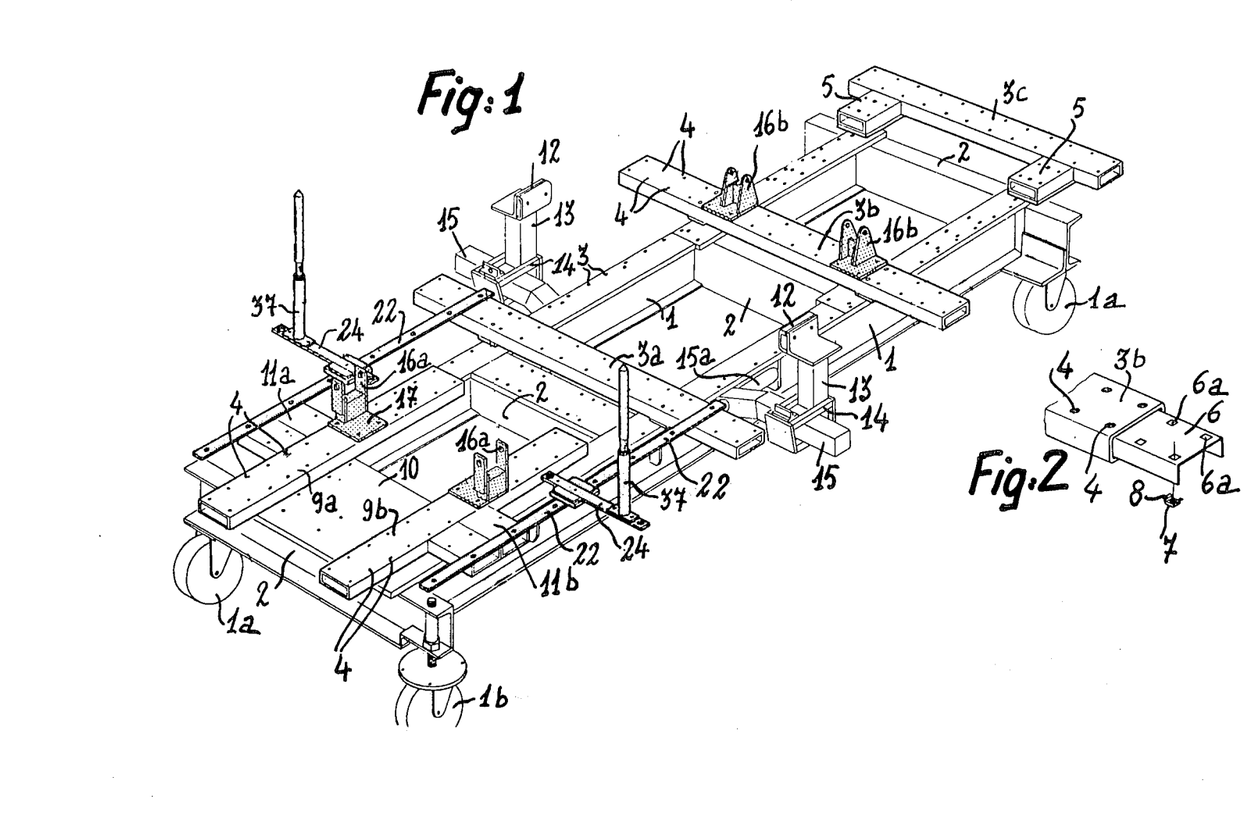
FIG. 1 is a perspective view of the checking bench which forms part of this appliance as well as a certain number of ancillary components of this latter.
FIG. 2 is a partial view in perspective showing a detail of construction of the removable cross-members provided on said bench.

The checking bench shown in FIG. 1 consists of a platform constituted in the usual manner by two longitudinal members 1 and a certain number of cross-members 2. The bench is mounted on small wheels 1a placed at the four corners. However, one of these small wheels, namely the wheel designated by the reference 1b, is adjustable for height in order to permit straightening or truing-up of said bench.

The longitudinal members 1 are provided on their top faces with a series of uniformly spaced holes 4 which thus constitute a modular array of drilled holes, for example with a pitch of one hundred millimeters. It should be noted in this connection that the checking bench under consideration can be constructed from a straightening frame or bench jig which is not drilled and to which are adapted plates provided with the desired array of drilled holes and mounted above the longitudinal members of the checking branch.

There are additionally mounted on said bench three removable cross-members 3a, 3b and 3c each constituted by a tubular beam having a rectangular cross-section. Said cross-members are accordingly endowed with very high torsional strength.

Said cross-members can be fixed in different positions on the checking bench by means of the holes drilled in this latter and by means of the holes drilled in said cross-members. Each cross-member is in fact provided with two series of uniformly spaced holes 4 which are also intended to constitute a modular array.

As can be seen in the drawings, one of the removal cross-members, namely the cross-member 3c, is located at one of the ends of the checking bench. This cross-member is in fact provided on one side with two perpendicular extensions 5 formed by sections of hollow beam of rectangular cross-section. These extensions are also provided with a modular array of drilled holes and therefore make it possible to fix the corresponding cross-beam 3c in an overhung position as shown in FIG. 1 in order to increase the total useful length of the appliance if this should prove necessary.

The holes provided in the cross-beams 3a, 3b, 3c can be internally threaded in order to permit screwing of nuts for the attachment of ancillary components and fastening brackets which will be described hereinafter. However, an internal screw-thread formed in each hole would be liable to impair the accuracy of spacing between the axes of the holes. Furthermore, any damage to the screw threads could give rise to awkward problems.

For this reason, a more advantageous solution is contemplated for screwing fixing bolts within the holes of the cross-members. This solution is illustrated in FIG. 2 and consists in making provision within each cross-member for a sectional member 6 having a cross-section in the shape of an inverted U, nuts 7 being mounted on the central web of said sectional member and held in position by means of resilient fastening lugs 8. This accordingly avoids the need to form directly an internal screw-thread within the holes of the removable cross-members. Moreover, in the event that certain nuts sustain damage during use, it is only necessary to remove the corresponding sectional member 6 and to replace the defective nuts.

In addition to the three cross-members 3a, 3b, 3c, the checking bench is adapted to carry two removable sole-pieces 9a and 9b disposed in the longitudinal direction at the end of the bench opposite to the point of attachment of the cross-member 3c. In the same manner as the cross-members 3a, 3b, 3c, these sole-pieces consist of two hollow beams having a rectangular cross-section and the top face of which is provided with a series of drilled holes 4 corresponding to a modular array. Each sole-piece also contains a sectional member 6 having a cross-section in the shape of an inverted U and pierced with a series of holes 6a corresponding to those of the top face of a sole-piece of this type, nuts 7 being fixed by means of resilient fastening lugs 8 opposite to each hole.

The removable sole-pieces 9a and 9b are fixed by bolting onto the longitudinal members 1 of the checking bench and in particular on a plate 10 which may be separately mounted on the cross-member of the front end of said bench. However, each removable sole-piece 9a, 9b is provided on one side with an appendage 11a or 11b which extends at right angles and is constituted by the juxtaposed assembly of two lengths of hollow beam having a rectangular cross-section. Said appendages are also provided with drilled holes 4 which again correspond to the modular array provided on all the ancillary components of the checking bench.

Figure 5:
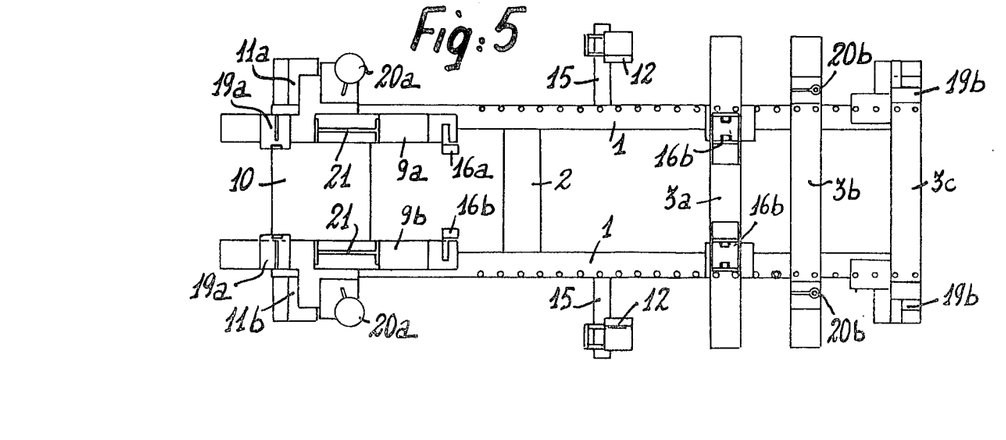
FIG. 5 is an overhead plan view of said appliance showing the arrangement which is contemplated in such a case.
Figure 8:
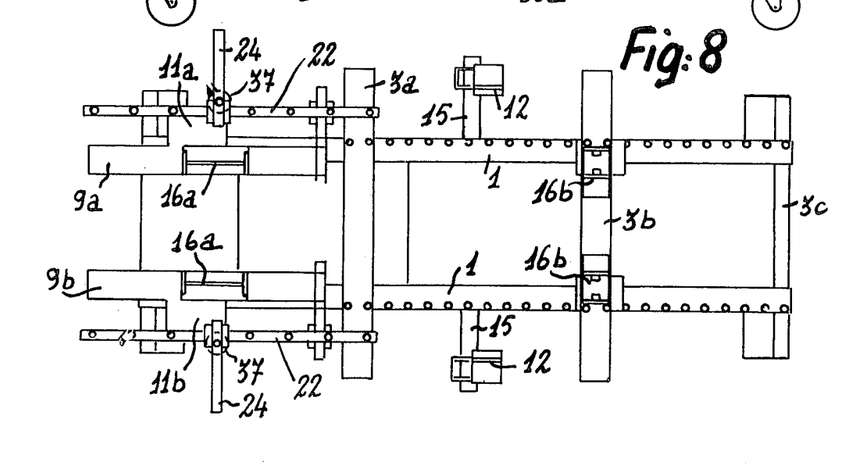
FIG. 8 is an overhead plan view of the appliance and showing the arrangement contemplated in such a case.
Figure 11:
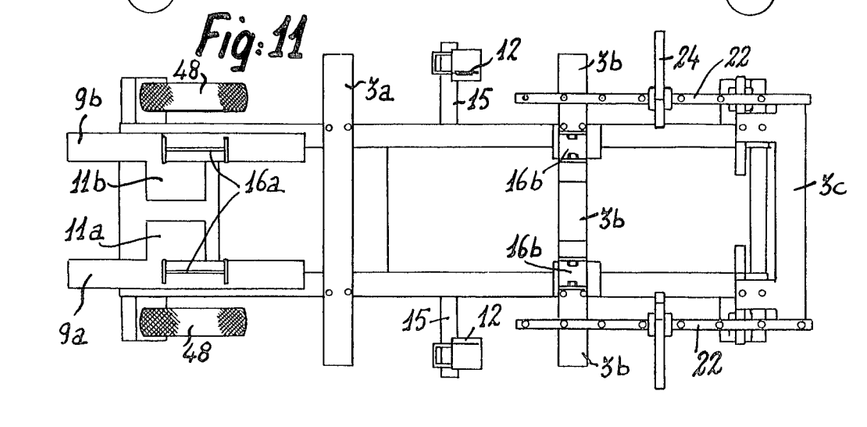
FIG. 11 is an overhead plan view of the appliance and showing the arrangement contemplated in such a case.

The two removable sole-pieces 9a and 9b are intended to be fixed substantially in the central axis of the front side-members of the vehicle to be checked. However, as will be explained hereinafter, it is possible to arrange these two sole-pieces in two different ways according to requirements by orienting their lateral appendages 11a or 11b either in the outward direction (as shown in FIGS. 1, 5 and 8) or on the contrary in the inward direction (as shown in FIG. 11).

The longitudinal members 1 are provided at an intermediate point of their length and on the outside with two clamps 12 for rigidly fixing the vehicle body to be checked, this being achieved by clamping the bottom body flanges. In practice, provision should preferably be made on each side of the bench for two clamps 12 rather than a single clamp. However, in order to simplify the accompanying drawings and this description, the equipment described and illustrated by way of example has only one clamp 12 on each side. Moreover, as will be mentioned hereinafter said clamps are not the only devices employed for rigidly fixing the vehicle body since they only take part in this fixation in conjunction with fastening brackets provided on each side.

Each clamp 12 is carried by a vertical column 13 which is secured by means of a fastening collar 14 to an outwardly projecting horizontal arm 15. This latter is slidably mounted on a horizontal bar 15a which is separately mounted along the corresponding longitudinal member 1 of the checking bench and the ends of which are fixed on said member. This accordingly makes it possible to modify the position of the clamps 12 in different directions.

In conjunction with the clamps 12, provision is made for two pairs of fastening brackets 16a, 16b which are mounted respectively at the front and rear ends of the bench. Each fastening bracket comprises a base plate 17 pierced by four holes with relative spacings corresponding to the modular array of drilled holes of the cross-members 3a, 3b, 3c and of the sole-pieces 9a, 9b, thus permitting attachment of said brackets on these latter.

Thus in the example illustrated in FIG. 1, the two rear fastening brackets 16b are fixed on the intermediate cross-member 3b. So far as the two front brackets 16a are concerned, they are fixed on the two front sole-pieces 9a, 9b. The locations at which said front brackets are fixed in position can clearly be modified at will on the cross-member 3b; the same applies to the sole-pieces 9a and 9b, and these latter can in turn be fixed in various positions on the checking bench according to the type of vehicle to be checked.

As can readily be understood, the two pairs of fastening brackets 16a and 16b are specific to each type of vehicle. However, these brackets are of very simple structural design by virtue of the fact that they can be fixed at different points in order to be placed in immediate proximity to the points of attachment provided on the vehicle to be checked. These fastening brackets are therefore of much more simple design than the jig brackets currently provided on checking benches for so-called "positive checking" operations.

It should also be pointed out that positional attachment of a vehicle body to the checking bench under consideration can be carried out by making use only of the lateral clamps 12 and the two pairs of fastening brackets 16a and 16b. As a rule, the four points of attachment materialized by the fastening brackets 16a and 16b will be located on the mountings provided for the front and rear wheel systems of the vehicle but as close as possible to the occupant compartment of this latter since this compartment is a non-deformable zone in modern vehicles. It must also be pointed out that a vehicle which may or may not remain equipped with its mechanical suspension accessories can also be fixed on the checking bench.

The checking equipment as thus constituted on the bench itself by the three removable cross-members 3a, 3b, 3c and by the sole-pieces 9a, 9b which are also removable can be employed with equal ease:

either for checking by the so-called "positive check" method;

or on the contrary for checking by taking a certain number of measurements.

In the first case, it is only necessary to complete the small set of fastening brackets formed by the two pairs of brackets 16a and 16b by means of a complementary set of brackets for checking the conventional points of a vehicle body, that is to say:

the ends of the front side-members,
attachment of the steering box,
attachment of the McPherson shock-absorbers,
attachment of the transmission or gear box,
attachment of the Panhard-type suspension rod or the like,
the ends of the rear side-members, and so forth.

Figure 3:
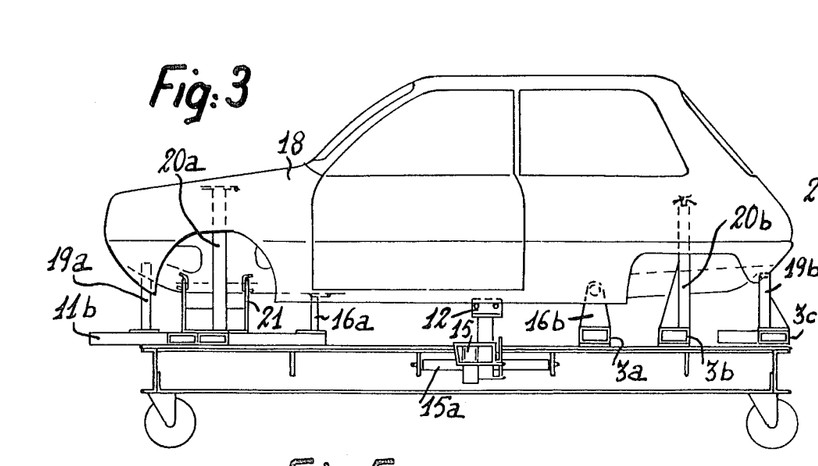
FIGS. 3 and 4 are views in elevation, looking respectively on the side and on the end, illustrating a positive-checking operation on a vehicle body by means of the appliance aforesaid.
Figure 4:
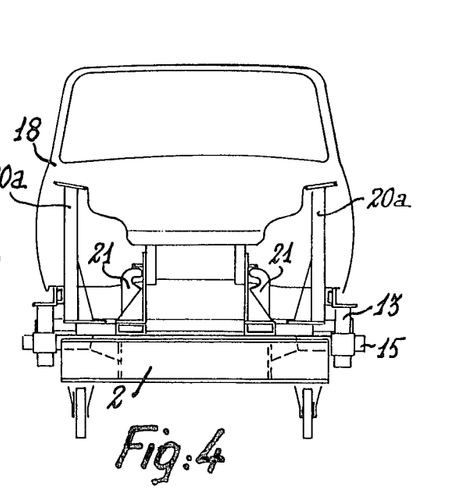

FIGS. 3 to 5 illustrate a case of utilization of the equipment under consideration for checking a vehicle body 18 by the "positive check" method.

In addition to the two pairs of fastening brackets 16a, 16b, a number of other fastening brackets are in this case mounted separately on the cross-members and sole-pieces of the checking bench. In this example, provision is made for two pairs of fastening brackets 19a and 19b which can be fixed on each end of the sub-frame. However, provision is also made for two pairs of support columns 20a and 20b which are intended to be fixed at the upper ends opposite to the normal point of attachment of the front and rear McPherson-type shock-absorbers. Provision is also made at the front end for brackets 21 which are intended to be attached within the interior of the wheel housings of the vehicle body as illustrated in FIGS. 3 and 4.

As will readily be understood, FIGS. 3 to 5 only illustrate one particular example of application of the method for positive checking by means of the equipment in accordance with the invention. It is in fact advisable to provide different assemblies and to employ other specific fastening brackets according to the different types of vehicle. Again in this instance, however, the fastening brackets concerned are of very simple constructional design since they are fixed on supports which can be moved to different locations according to requirements, these supports being constituted either by the removable cross-members 3a, 3b, 3c or by the movable sole-pieces 9a and 9b.

The equipment in accordance with the invention makes it possible to retain the inherent advantages of the checking benches usually employed for "positive checking". Furthermore, repairs can be performed in situ whilst the vehicle body is perfectly secured to the checking bench. As soon as a defective portion of the body has been reshaped, straightened or replaced, the required checking operation can be performed by means of the corresponding brackets. However, in contrast with the usual checking benches of this type, the fastening brackets are much more simple as has already been mentioned in the foregoing.

A further point already noted is that the equipment in accordance with the invention can also be employed for a checking operation which consists in taking a certain number of measurements. In this case, the lateral clamps 12 and the two pairs of fastening brackets 16a and 16b are also employed whilst the front brackets 16a can be of a type which is different from those illustrated in FIG. 1, for example of the same type as the brackets 21 shown in FIGS. 3 to 5. Both pairs of front and rear brackets 16a and 16b are in any case specific to each particular type of vehicle.

When the vehicle body has thus been fixed in position, the user can carry out a check at the same critical points already mentioned earlier in the case of a so-called "positive checking" operation. This type of inspection need only be based on a technical data sheet which is specific to the corresponding type of vehicle and mentions the values of the different measurements to be made. This checking operation can be carried out by means of gages or any other suitable measuring instruments. However, the user can also constitute a complementary technical data sheet by making a special record of measurements on the undamaged portions of a predetermined vehicle. This record can serve subsequently as a comparison element for other vehicles of the same type.

Accordingly, the measurements to be taken can advantageously be performed by means of measuring devices which also form part of the checking equipment under consideration. In actual fact, two identical devices are employed and each consists of a basic element, namely a rail 22 on which is mounted a carriage 23 for supporting a rule 24 which is placed at right angles and capable of sliding on said carriage. The rail 22 of each of these two devices is intended to be fixed in the longitudinal direction along either side of the vehicle body to be checked. Thus, in the example illustrated in FIGS. 6 to 8, the rail 22 of each device is fixed between the removable cross-member 3a and the lateral appendage 11a or 11b of the movable sole-piece 9a or 9b located on the corresponding side. This attachment is clearly carried out by bolting in the holes provided in these two supports. However, these two measuring devices can be mounted at different locations. Thus in the example illustrated in FIGS. 9 and 10, the rail 22 of each device is fixed between the cross-member 3c of the rear end and the intermediate cross-member 3b.

Figure 12:
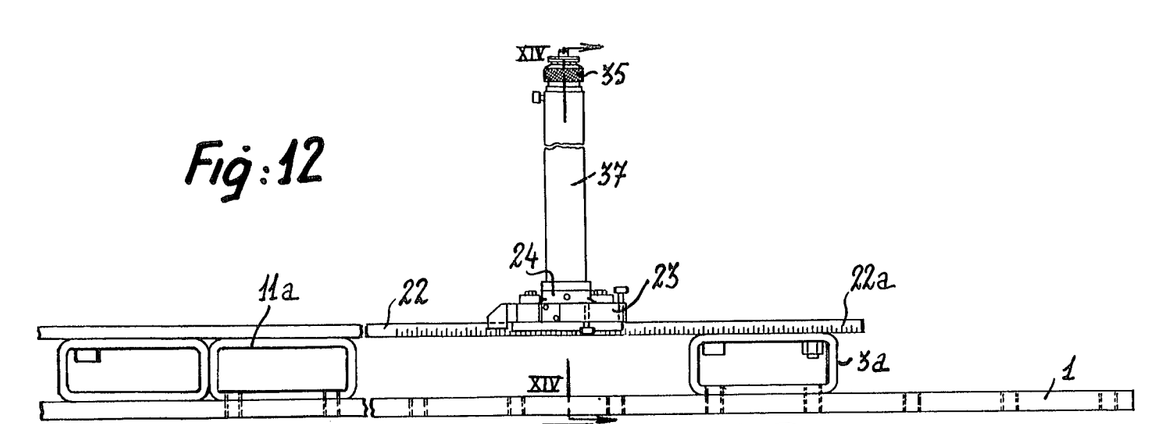
FIG. 12 is a view in side elevation showing one of the measuring devices which is specially designed for adaptation to the checking bench under consideration.
Figure 13:
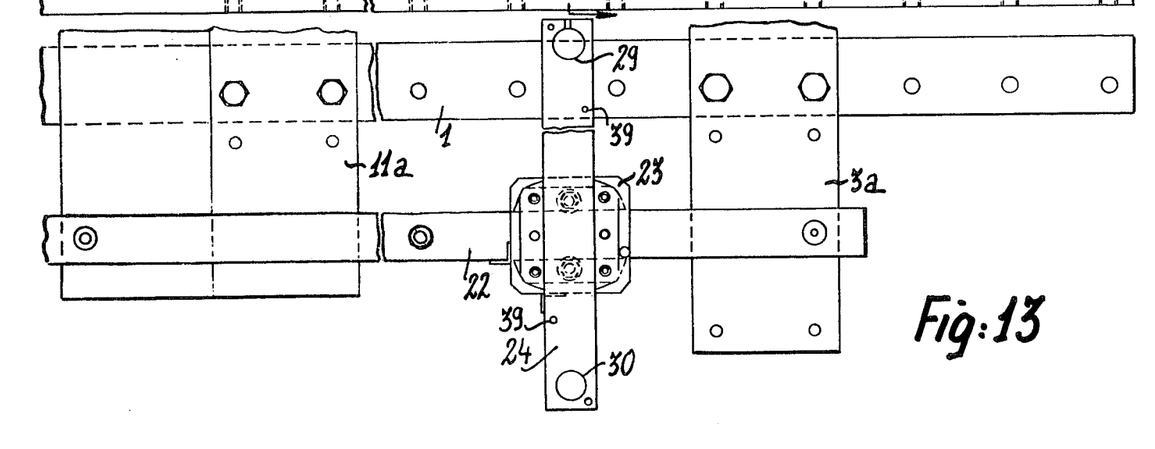
FIG. 13 is a fragmentary overhead plan view of said device.
Figures 14, 15, 16:
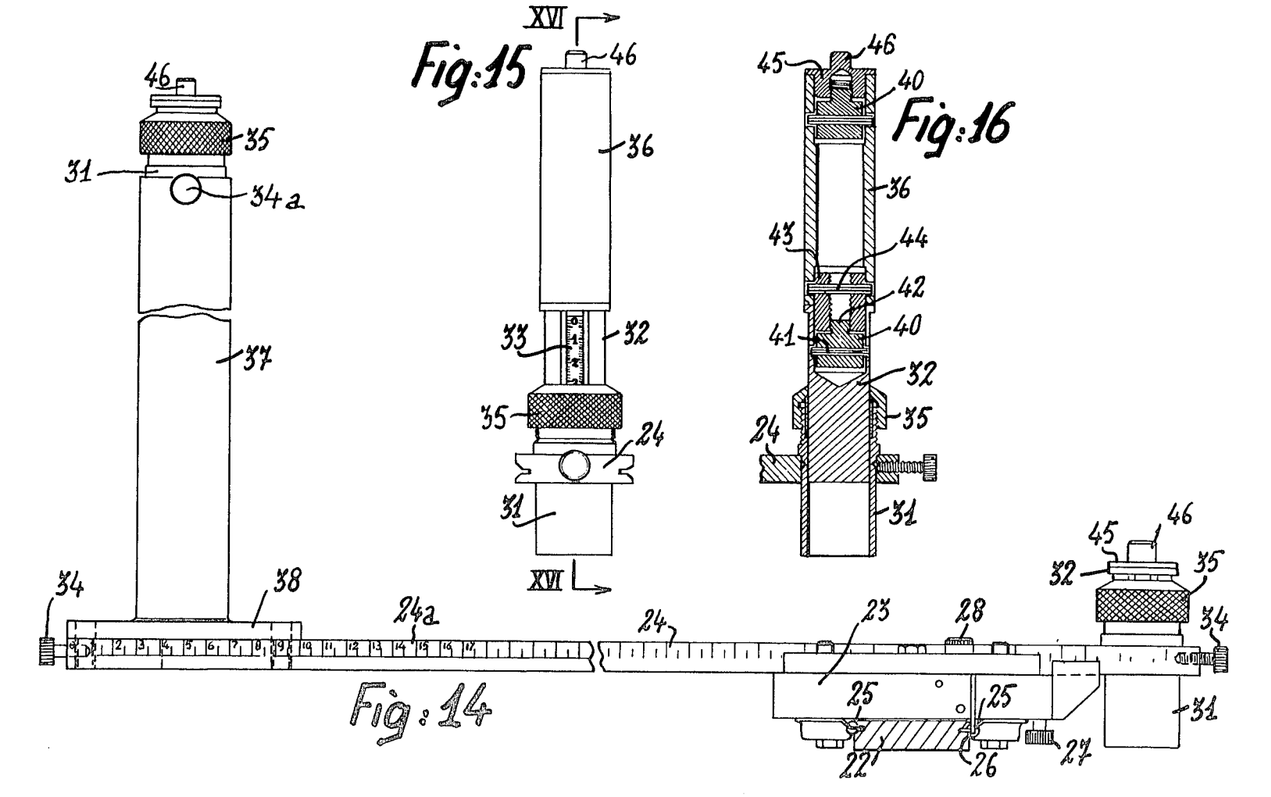
FIG. 14 is a sectional view taken along line XIV—XIV of FIG. 12 but to a different scale.
FIG. 15 is a view in elevation of an ancillary measuring element which can be adapted to said device.
FIG. 16 is a sectional view taken along line XVI—XVI of FIG. 15.

The carriage 23 is accurately guided on the rail 22 by means of two rows of balls 25 provided on the sides of said carriage which are applied against said rail, corresponding grooves 26 being formed in the sides of the carriage. So far as the movable rule 24 is concerned, said rule is guided in the same manner within the passage formed on the top face of the carriage body. As will readily be understood, locking means such as clamping screws 28 and 27 are provided respectively for locking the carriage 23 on the rail 22 and for locking the movable rule 24 on said carriage in the desired position. In order to check these positions, the rail 22 and the movable rule 24 are provided with graduations 22a and 24a.

A bore 29 or 30 for positioning a measuring accessory is provided at each end of the rule 24. Said measuring accessory can consist of a sleeve 31 within which there can be engaged a column 32 provided with a millimetric graduated scale 33. Positional locking of the sleeve 31 can be performed by means of a locking screw 34 provided at each end of the removable rule 24. Positional locking of the column 32 is carried out by pinching of the corresponding end of the sleeve 31 which is provided with a clamping ring 35 for this purpose. In consequence, the position of the column 32 can thus be accurately adjusted for height.

Said column 32 can be fitted with various extensions 36 of different lengths such as 50, 100, 200 and 400 millimeters, for example. There can be adapted to the upper ends of said extensions various checking accessories such as measuring heads or terminals which are intended to be placed in contact with predetermined reference points on the vehicle body with respect to which it is necessary to take certain measurements.

However, each of the two measuring devices thus provided further comprises a column 37 which can be fitted with the sleeve 31. The lower end of the column has a base plate 38 which can be fixed on top of the movable rule 24 by bolting. To this end, a series of holes 39 are drilled in said rule. At the upper end, said column 37 is so arranged as to receive the sleeve 31 which can be maintained in position by means of a screw 34a. It is also possible to fix on this column an extension or end-piece which can be maintained in position by means of the clamping ring 35 of the sleeve 31. The column 37 can be employed for taking measurements at top checking points such as the points of attachment of shock-absorbers.

The system of interassembly of the extensions must be very accurate in order to avoid any risk of error. To this end, the bore which is formed at the upper end of the column 32 is machined to a high degree of accuracy and assembly is carried out by means of a core 40 which is "loosely" mounted within the interior of said upper end of the column and pivoted about a pin 41. The upper portion of said core is adapted to carry a threaded nipple 42 on which is intended to be screwed a bushing 43 which is accurately engaged to a partial extent within the lower end of the extension 36 and rigidly fixed within this latter by means of a locking-pin 44. The external wall of the projecting portion of said bushing 43 is in fact intended to be accurately fitted within the upper end of the sleeve 31 in order to ensure perfect centering of the extension 36 with respect to said sleeve.

The arrangement of the upper end of the extension 36 is similar to that of the upper end of the sleeve 31 and is therefore fitted with a "floating core" 40. There can be adapted on said core another extension or if necessary an end-piece 45 which is fixed in position in much the same manner as the bushing 43. Said end-piece carries an external nipple 46. Furthermore, it should be pointed out that said end-piece 45 can be fixed on the core 40 of the column 32.

The system of assembly which is thus contemplated permits of rapid screwing and perfect centering. Centering is in fact ensured by means of bores which can be ground with precision, and no longer by means of the "screw and nut" system of assembly. Moreover, the threaded male portion of the system is protected in the event of falling of this latter onto the ground.

The graduations 22a and 24a provided respectively on the rail 22 and the movable rule 24 can be replaced by any other measuring and checking systems such as, for example, tapes graduated in millimeters or reading sliders. Provision can also be made for linear transducers or detectors which are mounted on the carriage 23. This solution has an advantage in that millimetric tapes are dispensed with and that it permits of direct, absolute or differential reading by means of an electronic visual display device. It is readily apparent that a similar device can be adapted to the vertical gages for checking height measurements.

Figure 6:
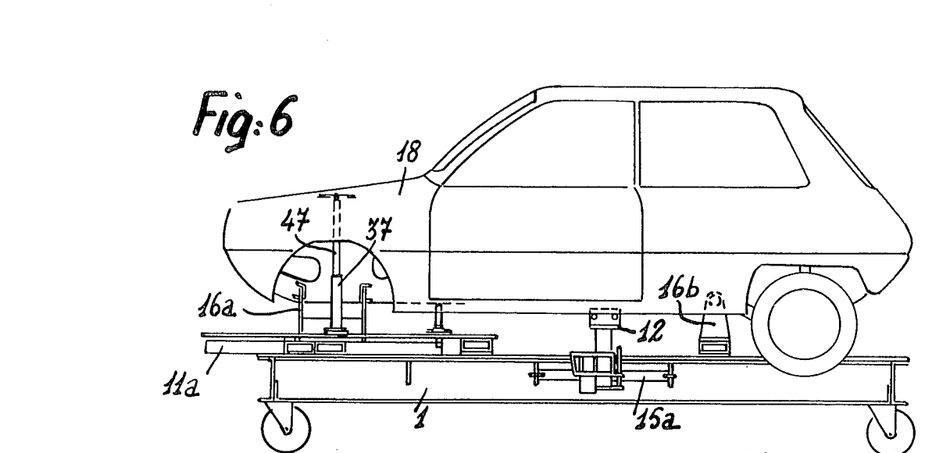
FIGS. 6 and 7 are views in elevation, looking respectively on the side and on the end and showing a checking operation which consists in a measurement performed on the front end by means of said appliance.
Figure 7:
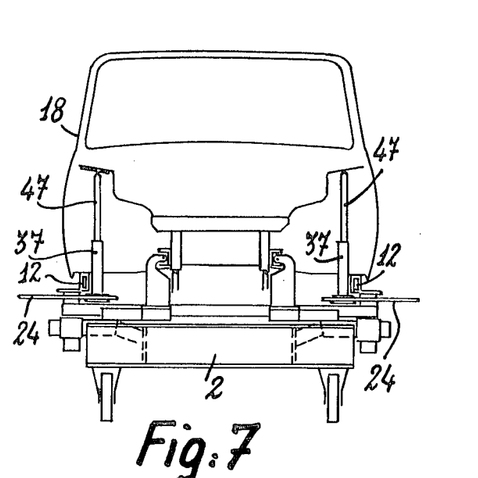

The example of checking by measurement as illustrated in FIGS. 6 to 8 corresponds to the operation which consists in checking attachment locations of front shock-absorbers of the McPherson type. In this case, the front wheels as well as the corresponding shock-absorbers have been removed beforehand and a measuring gage or extension 47 is adapted to the column 37 which is mounted on each measuring device. The upper end of said gage or extension 47 must in that case be placed in corresponding relation to the center of the attachment location of the upper end of the corresponding McPherson shock-absorber.

Figure 9:
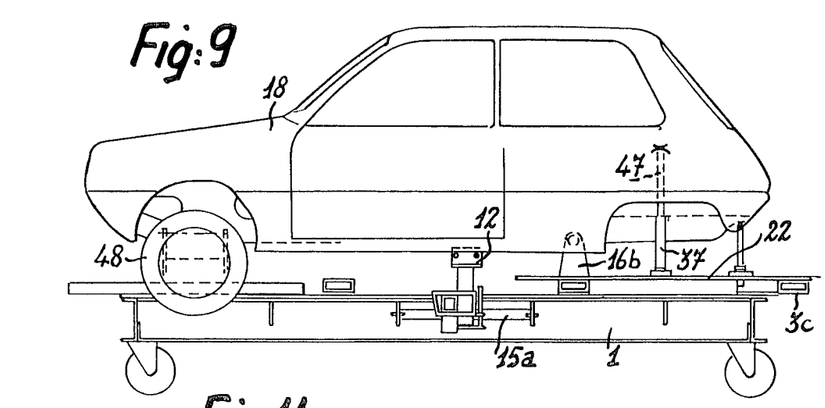
FIGS. 9 and 10 are views in elevation, looking respectively on the side and on the end and showing a checking operation which consists in a measurement performed on the rear end by means of said appliance.
Figure 10:
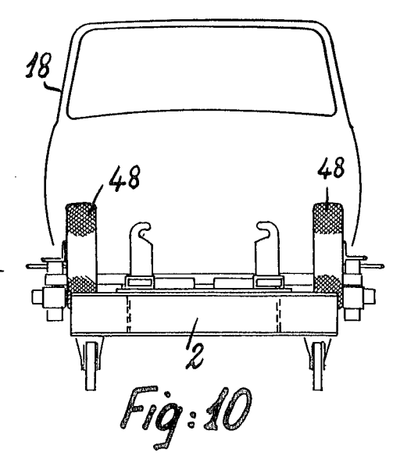

Referring now to FIGS. 9 to 11, these figures illustrate the reverse case, that is to say the case of a measurement taken with respect to the attachment location of the rear McPherson shock-absorbers. In this case, the front wheels 48 are left in position and the front movable sole-pieces 9a and 9b must be placed in reverse in order to free the location of the wheels by placing the lateral appendages 11a and 11b towards the interior and no longer towards the exterior as had previously been the case. To this end, it is only necessary to reverse the two movable sole-pieces 9a and 9b as shown in FIG. 11.

As can readily be understood, however, the two measuring devices provided in the equipment under consideration make it possible to take many other measurements on the vehicle body to be checked. Highly accurate checking by measurement can thus be achieved. It should be pointed out in this connection that this checking operation is much more accurate than with the measuring instruments which are currently in use. This is due to the fact that the vehicle body is perfectly maintained in position on the checking bench and that the different measuring instruments are also accurately fixed on this latter or more specifically on the adjustable supports carried by the bench.

It is worthy of note in this connection that the equipment under consideration is supported on four basic jig brackets constituted by the two pairs of fastening brackets 16a and 16b and that the user always has the basic safety system which is provided with a maximum degree of precision by four very important points on the vehicle. The other points can then be controlled either by means of complementary brackets in the case of a so-called "positive checking" measurement or by means of a measuring system as has just been described.

In both cases, however, the four basic points materialized by the two pairs of fastening brackets 16a and 16b automatically determine the level position or trim of the vehicle since the central and longitudinal plane of this latter coincide with that of the checking bench and of the movable supports carried by this latter. Under these conditions, the rails 22 of both measuring devices will automatically be placed parallel to the mid-plane of the vehicle. The appliance can therefore be put into service in a very short time since there is no longer any adjustment of the measuring system with respect to the vehicle. Moreover, the existence of four very rigid points of attachment materialized by the two pairs of brackets 16a and 16b serves to avoid any risk of deformation of door frames when tractive forces are applied on the side members during straightening and truing operations. In the case of measuring appliances which are employed at the present time, only the bottom body flanges are subjected to these tractive forces, which is indeed the underlying cause of one possibility of deformation of door frames.

A further advantage of the equipment in accordance with the invention lies in the fact that this latter virtually constitutes an "evolutionary" system. In fact, when a vehicle body builder or repairer acquires equipment of this type, he does not purchase a single appliance which would exclude the possibility of undertaking certain repair jobs. On the contrary, it is possible by means of the appliance in accordance with the invention to change over at any time from the system of checking by measurement to the system of positive checking by means of a set of fastening brackets. This can be the case in particular if the measurement checking operation appears to be too time-consuming or else unsuited to the extensive nature of body deformations. In order to switch over from the measuring system to the positive checking system, it is only necessary to acquire the complementary set of brackets which are specific to the particular type of vehicle to be checked.

It is also possible, however, to employ the appliance in accordance with the invention in much the same manner as a bench for carrying out body-reshaping and truing operations. By virtue of the very fact that the body is very securely attached to the checking bench, it is in fact possible to exert straightening efforts on the body by means of traction or thrust units such as hydraulic body-straightening devices.

What is claimed is:

1. An equipment unit for checking any deformations of a vehicle body, comprising a checking bench constituted by a platform having at least two longitudinal members pierced with holes for fixing various components in order to secure the vehicle body to be checked, as well as a plurality of cross members which can be fixed at different points along the longitudinal members of said platform and on which are provided series of uniformly spaced holes, wherein said unit further comprises two removable sole pieces of elongated shape and each provided with a lateral appendage on one side, said sole pieces being intended to be fixed on the checking platforms substantially in the central axis of the front side members of the vehicle to be checked, said sole pieces as well as the lateral appendages thereof being provided in the same manner as the cross-members with series of uniformly spaced holes for fixing therein body attachment elements and/or measuring or checking accessories.

2. A checking equipment unit as claimed in claim 1, in which the longitudinal members of the checking bench are provided at an intermediate point of their length and on the outside in a manner known per se with a clamp for gripping the bottom flanges of the vehicle body to be checked, wherein provision is made in conjunction with said claims for two pairs of fastening brackets which are specific to the exact type of vehicle body and capable of being fixed on the movable cross-members or on the removable sole pieces in order to insure that said vehicle body is rigidly fixed in a predetermined position, said fastening bracket being intended to be fixed on precise reference points of the vehicle body to be checked.

3. A checking equipment unit as claimed in claim 1, wherein said unit comprises a removable cross-member provided on one side with two extensions at right angles to said cross-member which can be fixed in overhung position by means of said extensions on one end of the checking platform.

4. A checking equipment unit as claimed in claim 1, wherein each cross-member is constituted by a hollow beam having a rectangular cross-section within which is fitted a sectional member having a cross-section in the shape of an inverted U, the top web of said sectional member being pierced with holes corresponding to the holes of the top face of the corresponding cross-member, a nut being placed opposite to each hole and held in position by means of a resilient fastening lug or the like.

5. A checking equipment unit as claimed in claim 1, wherein provision is made for two removable measuring devices each comprising a rail which is capable of serving as a support for the different components of the corresponding measuring devices and is in turn capable of being fixed in the longitudinal direction between two removable cross members or between one of said cross members and the lateral appendage of a removable sole piece, said rail being adapted to carry a movable carriage on which a rule is slidably mounted at right angles to said rail and so arranged as to receive checking gauges or like checking and/or measuring elements, each of said gauges and/or said elements having a sleeve for fitting in said rule within which sleeve there is engaged a column.

6. A checking equipment unit as claimed in claim 5, wherein provision is made for extensions of different lengths to be additionally fitted on one of the columns which are separately mounted on the movable rule of each measuring device, each extension aforesaid being so designed as to contain at the lower end thereof a projecting bushing which is intended to be engaged within the interior of the upper end of the corresponding column in order to ensure accurate centering of said extension which is assembled by screwing of said bushing onto a threaded nipple provided on a core which is pivotally mounted within the interior of the upper end of said column.

* * * * *